US007668670B2

(12) United States Patent
Lander

(10) Patent No.: US 7,668,670 B2
(45) Date of Patent: Feb. 23, 2010

(54) TRACKING VIBRATIONS IN A PIPELINE NETWORK

(75) Inventor: Paul Lander, Maynard, MA (US)

(73) Assignee: Itron, Inc., Liberty Lake, WA (US)

( * ) Notice: Subject to any disclaimer, the term of this patent is extended or adjusted under 35 U.S.C. 154(b) by 0 days.

(21) Appl. No.: 10/959,994

(22) Filed: Oct. 8, 2004

(65) Prior Publication Data

US 2005/0060105 A1 Mar. 17, 2005

Related U.S. Application Data

(63) Continuation-in-part of application No. 10/291,748, filed on Nov. 12, 2002, now Pat. No. 6,957,157.

(51) Int. Cl.
*G01M 3/00* (2006.01)

(52) U.S. Cl. .............................. 702/51; 702/56; 702/54; 73/40.5 R; 340/605; 340/683

(58) Field of Classification Search ................... 702/51, 702/182, 54, 56; 73/40.5, 592, 40, 152.58; 340/605, 683

See application file for complete search history.

(56) References Cited

U.S. PATENT DOCUMENTS

| 3,173,003 A | 3/1965 | Muller-Girard |
| 3,223,194 A | 12/1965 | Michael |
| 3,351,910 A | 11/1967 | Miller et al. |

(Continued)

FOREIGN PATENT DOCUMENTS

DE     3726585 A1    2/1989

(Continued)

OTHER PUBLICATIONS

H. Schwarze; "Computer supported measuring system for automatic control of pipe networks and leak detection"; Technisches Messen 55(7-8); pp. 279-285; 1988 (Partial Translation included in text).

(Continued)

*Primary Examiner*—Drew A Dunn
*Assistant Examiner*—Hien X Vo
(74) *Attorney, Agent, or Firm*—Dority & Manning, P.A.

(57) ABSTRACT

Tracking vibrations on a pipeline network includes installing multiple vibration recorders on the pipeline network, with each recorder including a sensor, a processor, and a communication device. At each vibration recorder, vibration signals are received from the sensor at programmed times under the control of the processor of the vibration recorders and processed by the processor. The processed vibration signals are communicated from the vibration recorder to a reader device using the digital communication device. In addition, at a particular vibration recorder, meter readings from a flow meter associated with the particular vibration recorder are received. The meter readings are indicative of a level of flow in the pipeline network, and are communicated from the particular vibration recorder to a reader device using the communication device of the particular vibration recorder. Thereafter, the processed vibration signals from the one or more reader devices are collected at a central computer system. Finally, the collected processed vibration signals and the meter readings are analyzed at the central computer system to determine abnormal vibration patterns and to obtain measures of any leaks present in the pipeline network.

31 Claims, 15 Drawing Sheets

U.S. PATENT DOCUMENTS

| | | | |
|---|---|---|---|
| 3,413,653 A | 11/1968 | Wood | |
| 3,478,576 A | 11/1969 | Bogie | |
| 3,534,337 A | 10/1970 | Martin et al. | |
| 3,697,970 A | 10/1972 | Jaxheimer | |
| 4,019,373 A | 4/1977 | Freeman et al. | |
| 4,083,229 A | 4/1978 | Anway | |
| 4,172,379 A | 10/1979 | van Tilburg et al. | |
| 4,237,454 A | 12/1980 | Meyer | |
| 4,289,019 A | 9/1981 | Claytor | |
| 4,306,446 A | 12/1981 | Fukuda | |
| 4,327,576 A | 5/1982 | Dickey et al. | |
| 4,543,817 A | 10/1985 | Sugiyama | |
| 4,609,994 A | 9/1986 | Bassim et al. | |
| 4,640,121 A | 2/1987 | Leuker et al. | |
| 4,779,458 A | 10/1988 | Mawardi | |
| 4,844,396 A | 7/1989 | Norton | |
| 4,858,462 A | 8/1989 | Coulter et al. | |
| 4,958,296 A | 9/1990 | Saitoh et al. | |
| 4,977,529 A * | 12/1990 | Gregg et al. | 703/18 |
| 5,010,553 A | 4/1991 | Scheller et al. | |
| 5,038,614 A | 8/1991 | Bseisu et al. | |
| RE33,722 E | 10/1991 | Scifres et al. | |
| 5,058,419 A | 10/1991 | Nordstrom et al. | |
| 5,099,437 A | 3/1992 | Weber | |
| 5,117,676 A | 6/1992 | Chang | |
| 5,179,862 A | 1/1993 | Lynnworth | |
| 5,205,173 A | 4/1993 | Allen | |
| 5,225,996 A | 7/1993 | Weber | |
| 5,272,646 A | 12/1993 | Farmer | |
| 5,361,636 A | 11/1994 | Farstad et al. | |
| 5,416,724 A | 5/1995 | Savic | |
| 5,531,099 A | 7/1996 | Russo | |
| 5,541,575 A | 7/1996 | Virnich | |
| 5,544,074 A | 8/1996 | Suzuki et al. | |
| 5,578,834 A | 11/1996 | Trobridge | |
| 5,619,192 A * | 4/1997 | Ayala | 340/870.02 |
| 5,675,506 A | 10/1997 | Savic | |
| 5,854,994 A | 12/1998 | Canada et al. | |
| 5,960,807 A * | 10/1999 | Reyman | 137/1 |
| 5,974,862 A * | 11/1999 | Lander et al. | 73/40.5 A |
| 6,082,193 A | 7/2000 | Paulson | |
| 6,189,384 B1 | 2/2001 | Piety et al. | |
| 6,424,270 B1 | 7/2002 | Ali | |
| 6,453,247 B1 | 9/2002 | Hunaidi | |
| 6,530,263 B1 | 3/2003 | Chana | |
| 6,553,336 B1 | 4/2003 | Johnson et al. | |
| 6,567,006 B1 * | 5/2003 | Lander et al. | 340/605 |
| 6,611,769 B2 | 8/2003 | Olson | |
| 6,657,552 B2 * | 12/2003 | Belski et al. | 340/870.02 |
| 6,691,724 B2 * | 2/2004 | Ford | 137/1 |
| 6,694,285 B1 * | 2/2004 | Choe et al. | 702/182 |
| 6,820,016 B2 * | 11/2004 | Brown et al. | 702/51 |
| 6,957,157 B2 | 10/2005 | Lander | |
| 7,007,545 B1 | 3/2006 | Martinek | |
| 7,039,532 B2 | 5/2006 | Hunter | |
| 7,239,250 B2 | 7/2007 | Brian et al. | |
| 7,259,690 B1 | 8/2007 | Furmidge et al. | |
| 7,263,450 B2 | 8/2007 | Hunter | |
| 2002/0193144 A1 | 12/2002 | Belski et al. | |
| 2003/0167847 A1 | 9/2003 | Brown et al. | |
| 2004/0093174 A1 | 5/2004 | Lander | |
| 2005/0279169 A1 | 12/2005 | Lander | |
| 2006/0036795 A1 | 2/2006 | Leach | |
| 2007/0130317 A1 | 6/2007 | Lander | |
| 2007/0234784 A1 | 10/2007 | Kates | |

FOREIGN PATENT DOCUMENTS

| | | |
|---|---|---|
| EP | 0955531 A1 | 11/1999 |
| WO | WO 2006/041981 | 4/2006 |

OTHER PUBLICATIONS

Supplementary European Search Report dated Mar. 2, 2001, 3 pages.
PCT International Search Report (Application No. PCT/US05/35929), Apr. 4, 2006, 4 pages.
PCT Written Opinion (Application No. PCT/US05/35929), Apr. 4, 2006, 9 pages.
MICROCORR Digital; Leak Detection—*Digital Leak Noise Correlator*; Palmer Environmental; MD Issue 1 Apr. 2001 UK; 8 pages.

\* cited by examiner

Fig. 14

TRACKING VIBRATIONS IN A PIPELINE NETWORK

CROSS-REFERENCE TO RELATED APPLICATIONS

This application is a continuation-in-part application of and claims priority to U.S. application Ser. No. 10/291,748, filed on Nov. 12, 2002 now U.S. Pat No. 6,957,157.

TECHNICAL FIELD

This description relates to tracking vibrations in a pipeline network.

BACKGROUND

Pipeline networks are commonly used to distribute fluids, such as water, natural gas, petroleum, and jet fuel. Undetected leaks in such pipeline networks may be expensive and, potentially, hazardous.

SUMMARY

A provided system may include a set of many low-cost, intelligent vibration recorders that are permanently installed on a pipeline network and communicate with flow meters that also are installed on the pipeline network. Each recorder is capable of sensing vibrations, obtaining meter readings, and communicating.

When a leak is present in a pipe, a pressure wave emanates from the turbulent source of the leak and travels away from the leak through the wall of the pipe and the fluid in the pipe. This leak signal is attenuated with distance and has a spectral signature (varying energy at different frequencies) that depends on the effective transfer function of the pipe network and the sensor connection. The effective range of the recorder depends on such factors as the pipe pressure, the leak signal strength and the variable background pipe flow and ambient noise levels present at the sensor.

Aspects of the system include installing the recorders on the pipeline network, recording and processing in the recorders, data transport (including meter reading data) from the recorder to a database using the reader and the controller, data analysis in the computer, and visual presentation of the analysis.

Water and other utility companies manage capital and operational expenditures, often with capital expenditures being more available than operational expenditures. Leak detection will yield significant savings in the form of reduced requirements for treatment and plant capacity, lost product, mandatory water use (revenue) restriction due to limited water resources, and reduced risk of catastrophic events. The challenge for water companies is to manage their human and capital resources to achieve sustainable network and leakage management. Currently, leak detection is performed in the field using personnel, vehicles and computerized leak detection and pinpointing equipment. The complete system, including recorders, readers, and controllers, provides the information needed to focus this effort with no additional operational expenditures.

In one general aspect, tracking vibrations on a pipeline network includes installing multiple vibration recorders on the pipeline network. Each vibration recorder includes a sensor, a processor, and a communication device. At each vibration recorder, vibration signals are received from the sensor at programmed times under the control of the processor of the vibration recorder, and the received vibration signals are processed by the processor of the vibration recorder. Processed vibration signals are communicated from the vibration recorders to one or more reader devices using the communication devices of the vibration recorders. In addition, at a particular vibration recorder, meter readings from a flow meter associated with the particular vibration recorder are received. The meter readings are indicative of a level of flow in the pipeline network, and are communicated from the particular vibration recorder to a reader device using the communication device of the particular vibration recorder. The processed vibration signals are collected from the one or more reader devices at a central computer system that analyzes the collected processed vibration signals in conjunction with the meter readings to determine abnormal vibration patterns and to obtain measures of any leaks present in the pipeline network.

Implementations may include one or more of the following features. For example, a vibration recorder may include a housing, and installing the vibration recorder may include securing the vibration recorder to a pipe of the pipeline network using one or more O-rings that extend around the pipe and engage the housing. The vibration recorder may be a component of a flow meter. A sensor of the vibration recorder may be a piezo-film sensing element oriented in the housing so as to be at a known orientation to a flow in a pipe when the vibration recorder is installed on the pipe.

Processing the received vibration signals may include tracking the received vibration signals over time. Tracking the received vibration signals over time may include computing a weighted average of the received vibration signals over a first period of time, and may further include computing a weighted average of the received vibration signals over a second period of time having a duration that differs from a duration of the first period of time. Processing the received vibration signals also may include determining a distribution of a parameter of the received vibration signals.

Communicating processed vibration signals meter readings from a vibration recorder to a reader device may include doing so in response to a command sent from the reader device or from a device to which the vibration recorder is connected. The processor also may initiate the communication. The processed vibration signals and meter readings may be communicated using a wireless communications channel. The meter readings may be communicated in conjunction with communicating the processed vibration signals, or separately from the processed vibration signals.

The pipeline network may be a water pipeline network, and a meter reader may carry a reader device such that communicating processed vibration signals from a vibration recorder to a reader device includes doing so in conjunction with a normal process of having the meter reader read a water meter.

Collecting the processed vibration signals and the meter readings from a reader device at the central computer system may include connecting the reader device to the central computer system and downloading the processed vibration signals and the meter readings from the reader device to the central computer system. Communications between the reader device and the central computer may include using a wireless communication channel.

Analyzing the collected processed vibration signals may include computing a leak index for a vibration recorder using processed vibration signals from the vibration recorder. Computing the leak index for the vibration recorder also may include using processed vibration signals from one or more additional vibration recorders. A leak status may be assigned to a vibration recorder using the leak index computed for the vibration recorder. Computing the leak index may include using known information about the pipeline network, such as an estimate of the approximate prevalence of leakage in the pipeline network. The leak index may be displayed using a solid color map. The leak status of one or more recorders may be represented graphically by using different colors. A graph showing a history or a statistical or nighttime distribution of processed vibration signals may be generated.

In another general aspect, detecting leaks in a pipeline network includes installing a vibration recorder on the pipeline network, with the recorder comprising a sensor, a processor, and a connection to a flow meter that produces meter readings indicative of a level of flow in the pipeline network. Vibration signals from the sensor at programmed times under the control of the processor are processed by the processor. Meter readings from the flow meter are received through the connection at programmed times under the control of the processor, and a leak in the pipeline network is detected using the processed vibration signals.

Implementations may include one or more of the following features. For example, the meter readings and the processed vibration signals may be communicated to the collection location using the communications device of the vibration recorder.

Detecting a leak in the pipeline network may include using the meter readings in conjunction with the processed vibration signals. For example, whether the leak is upstream or downstream of the flow meter may be determined based on a relationship between the meter readings and the processed vibration signals.

A usage profile may be generated from meter readings spaced, for example by 30 minutes or more, or a meter pattern may be generated from meter readings spaced, for example, by less than 30 minutes. The usage profile or the meter pattern may be communicated to a collection location using a communications device of the vibration recorder. A leak in the pipeline network may be detected using the usage profile or the meter pattern in conjunction with the processed vibration signals.

In another general aspect, a vibration recorder for detecting leaks in a pipeline network includes structure for installing the vibration recorder on the pipeline network, a sensor operable to receive vibration signals from the pipeline network, a connection to a flow meter that produces meter readings indicative of a level of flow in the pipeline network, and a processor. The processor is programmed to receive meter readings from the connection to the flow meter.

Implementations may include one or more of the following features. For example, the vibration recorder also may include a communication port operable to communicate data, and the processor may be programmed to communicate information regarding the meter readings as data using the communication port. The information regarding the meter readings may include, for example, measurements of flow, a usage profile generated from the meter readings, a meter pattern generated from the meter readings, or an alert indicating that the meter readings represent an irregular condition. The irregular condition may constitute, for example, reverse flow through the meter, continuous flow through the meter for more than a threshold period of time, or continuous flow through the meter at a level in excess of a threshold level. The processor also may be programmed to communicate an alert regarding the sensed vibration signals as data using the communication port.

The details of one or more implementations are set forth in the accompanying drawings and the description below. Other features will be apparent from the description and drawings, and from the claims.

DESCRIPTION OF DRAWINGS

FIG. 14 is a database table showing parameters of the recorders.

Like reference symbols in the various drawings indicate like elements.

DETAILED DESCRIPTION

Figure 1:
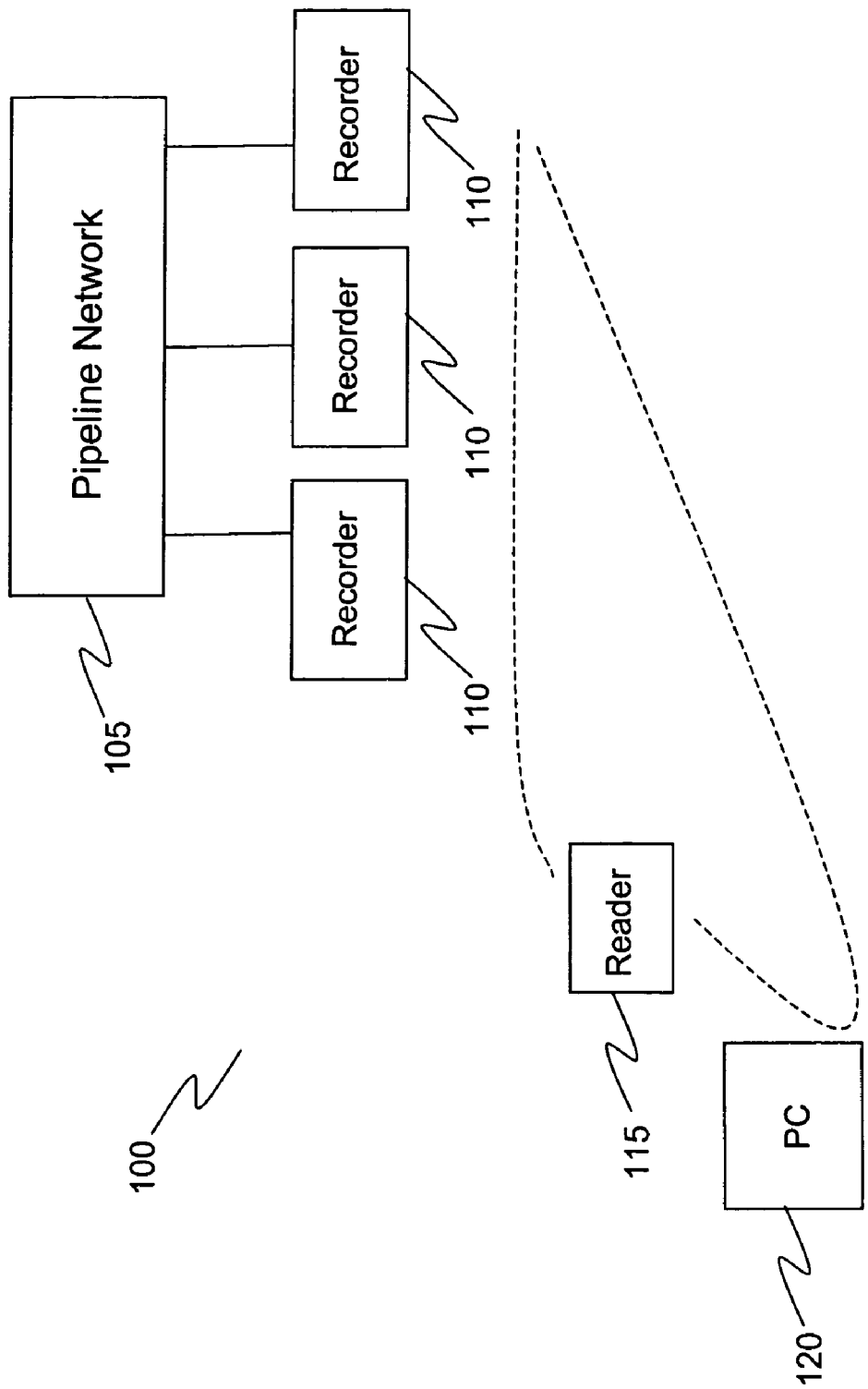
FIG. 1 is a block diagram of a system for tracking vibrations in a pipeline network.

Referring to FIG. 1, a system 100 for tracking vibrations and detecting leaks in a pipeline network 105 includes recorders 110 connected to the pipeline network 105. The recorders 110 collect data about vibrations in the pipeline network. One or more readers 115, when brought into proximity with the recorders 110, collect data from the recorders 110. The one or more readers 115 later download data to a computer 120, such as a personal computer (or PC), that processes the data from multiple loggers to detect vibrations and related phenomena (e.g. leaks) in the pipeline network 105.

While the pipeline network 105 is described below in terms of a water system, the pipeline may be another type of network. For example, the system may function with other pressurized fluid-carrying pipeline networks, such as those carrying natural gas, petroleum, and jet fuel.

In general, the recorders 110 are vibration recorders installed permanently on the pipeline network 105. For example, when the pipeline network 105 is a water network, the recorders may be installed permanently on water service lines, typically near the water meter in either meter pits or basements. In some implementations, a recorder 110 may be included as part of a water meter. In a gas distribution system, the recorders may be installed permanently on gas service lines, typically near the gas meter. In other networks, such as transmission lines, the recorders may be installed at valves, other convenient access points, or on the pipeline itself. The installation may be underground or above ground, depending on the construction of the pipeline and the facilities needed to communicate with the recorder.

Figure 2:
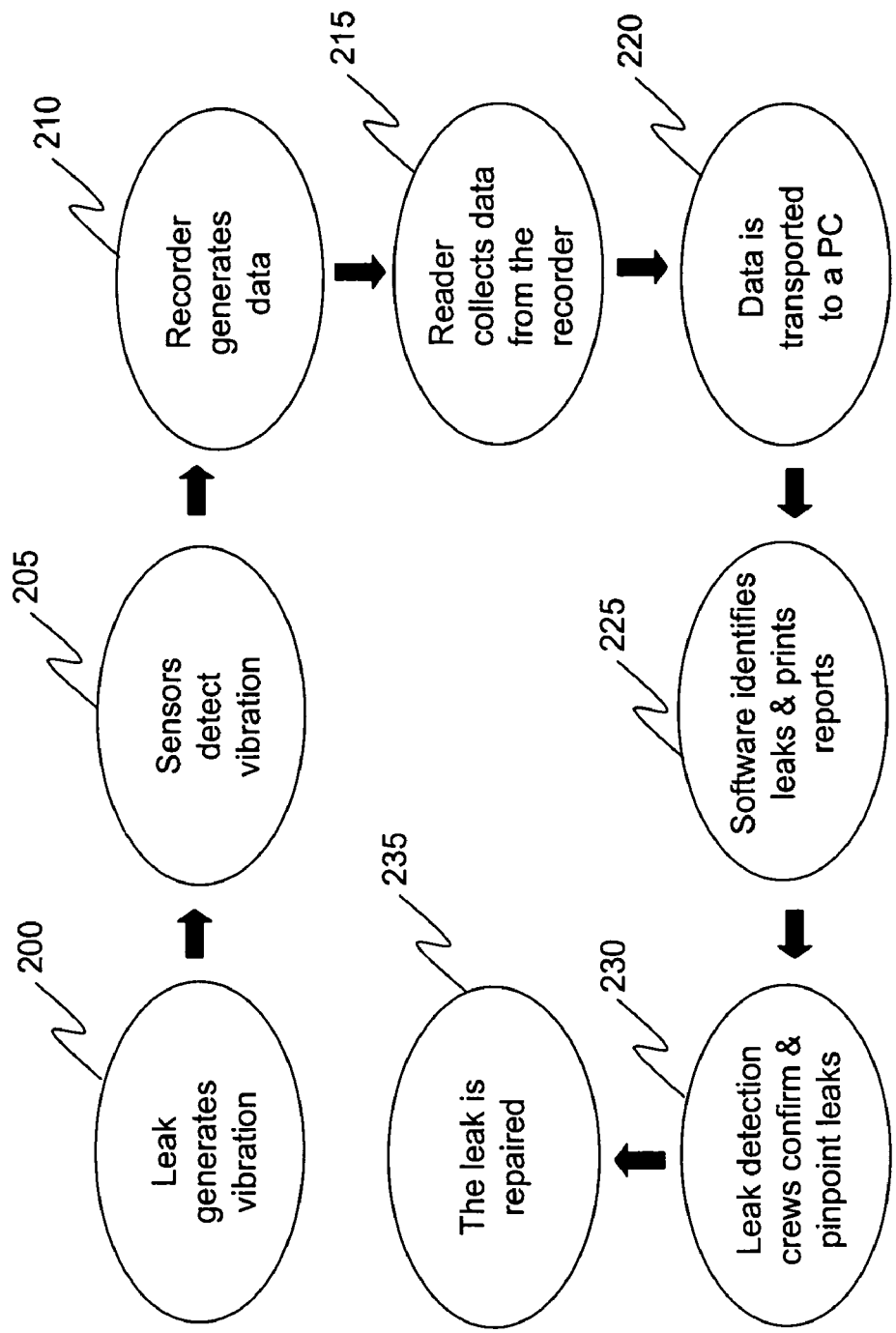
FIG. 2 is a block diagram of the data cycle for the system of FIG. 1.

In summary, and referring to FIG. 2, the data cycle for the system 100 begins with a leak generating vibrations (200). The sensor of the recorder generates a vibration signal corresponding to the vibrations (205) and the recorder generates data corresponding to the vibration signal (210). From time to time, a reader collects the data from the recorder (215). This data then is transported from the reader to a computer through a radio or other link (220). Software on the computer processes the data to identify leaks and generate corresponding reports (225). Repair personnel then use other systems, such as the DigiCorr system available from Flow Metrix, Inc., to confirm and pinpoint locations of the leaks (230). Finally, the pinpointed leaks are repaired (235).

Figure 3:
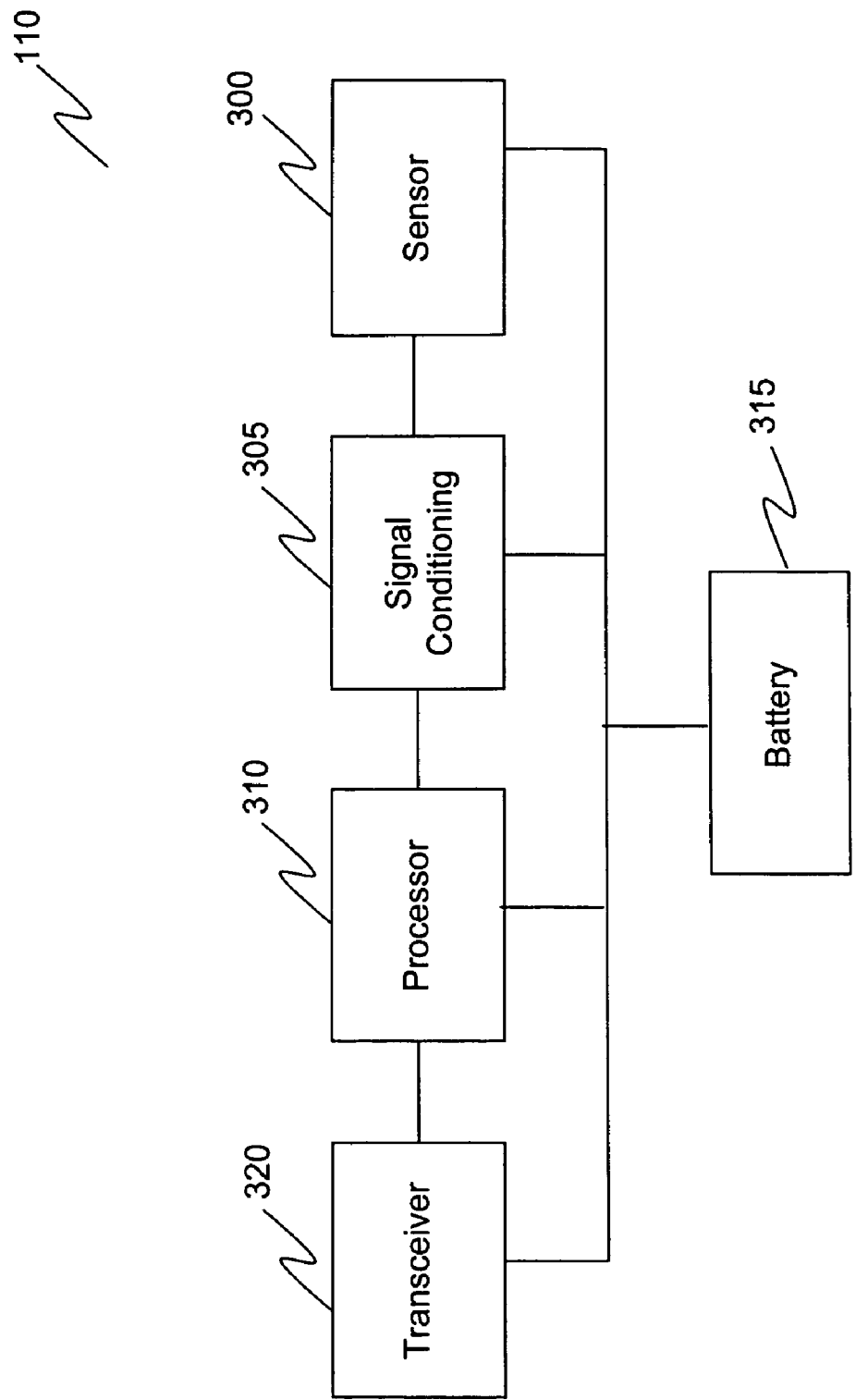
FIG. 3 is a block diagram of a recorder of the system of FIG. 1.

Referring to FIG. 3, each recorder 110 includes a vibration sensor 300, signal conditioning electronics 305, a processor 310, a battery power supply 315, and a low-power radio transceiver 320. The sensor 300 may be, for example, a piezo-film sensor, a piezo-cable sensor, or some other low-cost vibration sensor. The sensor 300 produces an electrical signal reflective of vibrations in the pipe to which the sensor is attached.

In colder climates, recorders are installed at the water meter, typically in a basement. In warmer climates, recorders are installed outdoors in an underground water meter pit. Recorders have an installation density designed to match the expected incidence of leakage. Most leaks occur on service pipes. Typical installations may be 10 per mile (one every 500 feet) or one per 10 services, depending on the terrain. Installations will be more dense in downtown areas and less dense in rural areas. In general, the density of installations may be approximately proportional either to the length of the pipeline network or to the number of services on the network.

Figure 4:
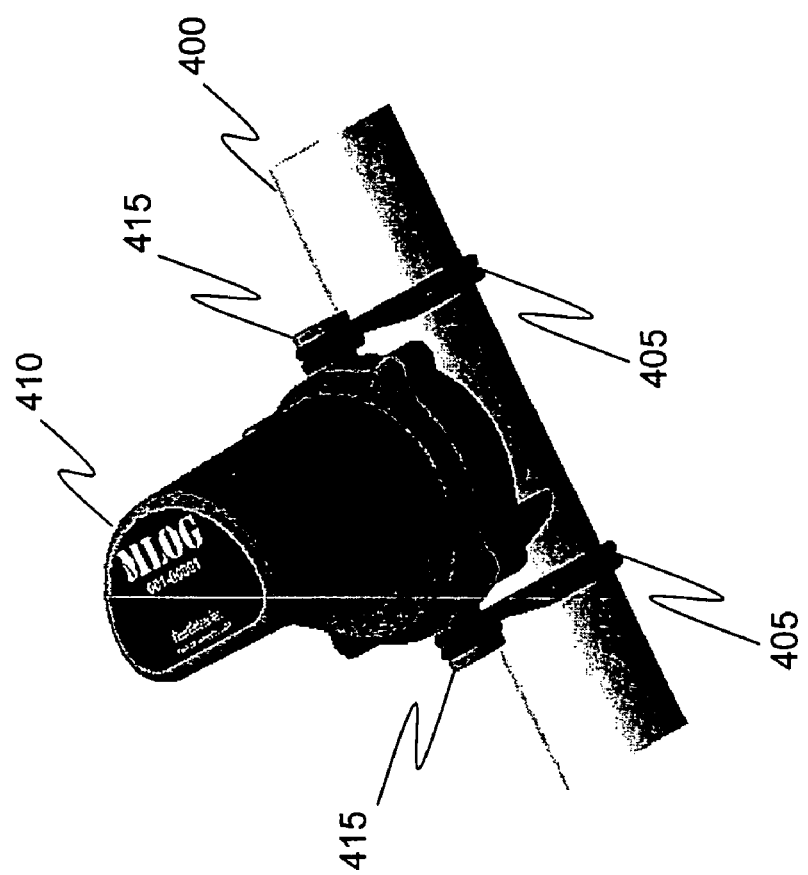
FIGS. 4 and 5 are perspective views showing mounting of the recorder of FIG. 3 on a pipe.
Figure 5:
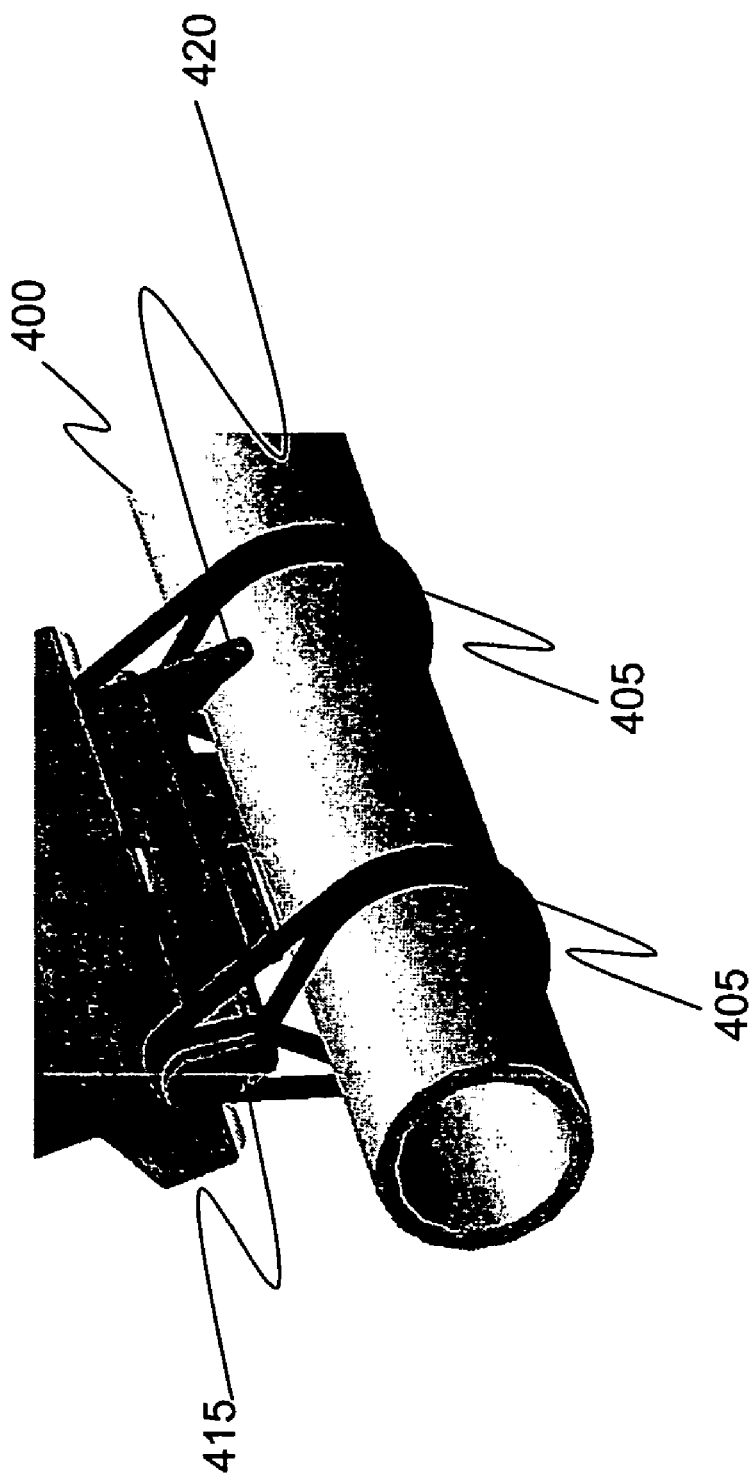

Installation is a significant logistical exercise and can be performed as part of a water meter upgrade program. As shown in FIGS. 4 and 5, the recorder 110 is mounted to a pipe 400 by two O-rings 405 that resist weathering and corrosion, require no tools and are easily and quickly fitted to the pipe. As shown, the housing 410 of the recorder includes connection points 415 that support attachment of the O-rings. In addition, the housing 410 includes curved brackets 420 that ease engagement with the pipe.

A piezo-film vibration sensor, the sensor employed in some implementations, is capable of registering ultra-low vibration levels, but must be directionally-oriented in the line of the flow. The housing design ensures this orientation when installed. Upon installation, the recorder is started with a radio signal from a specially programmed reader.

The signal conditioning electronics 305 receive the signal from the sensor 300, adjust the signal, and pass the adjusted signal to the processor 310. For example, the signal conditioning electronics 305 may be configured to use highpass filtering to reject low frequency vibrations that are present on the pipeline but generally are not produced by leakage. The signal conditioning electronics 305 may be further configured to reject high frequency vibrations through the use of lowpass filtering to improve the signal-to-noise ratio of the vibration recording by restricting high-frequency electronic noise. The signal conditioning electronics 305 also provide analog gain to amplify the signal received from the sensor to a level suitable for digitizing. The degree of analog gain may optionally be set under digital control of the processor 310. The amplified and filtered signal is digitized, using well-known digitizing techniques, either within the signal conditioning electronics 305 or within the processor 310.

The processor 310 generates data representative of the detected vibrations. The processor then stores the data for later transmission using the transceiver 320. The transceiver 320 may be a digital radio transceiver operating at 916 MHz.

The power supply 315 powers the electronic components of the recorder 110. In one implementation, the power supply includes two AA alkaline batteries that provide sufficient power for ten years of recorder operation.

The recorder records and processes a series of recordings every night to create a useful representation of the nighttime vibrations. During the night, leak signals are maximized due to minimal usage flow and hence maximal pipe pressure. Background and ambient noise is also minimal. The nighttime representation aims to exclude transient vibrations due to water usage or background noise and to characterize the pipe vibrations present during the quietest part of the night, whenever this occurs. The signal generated at the quietest point of the night may be referred to as the quiescent pipe signal.

Figure 6:
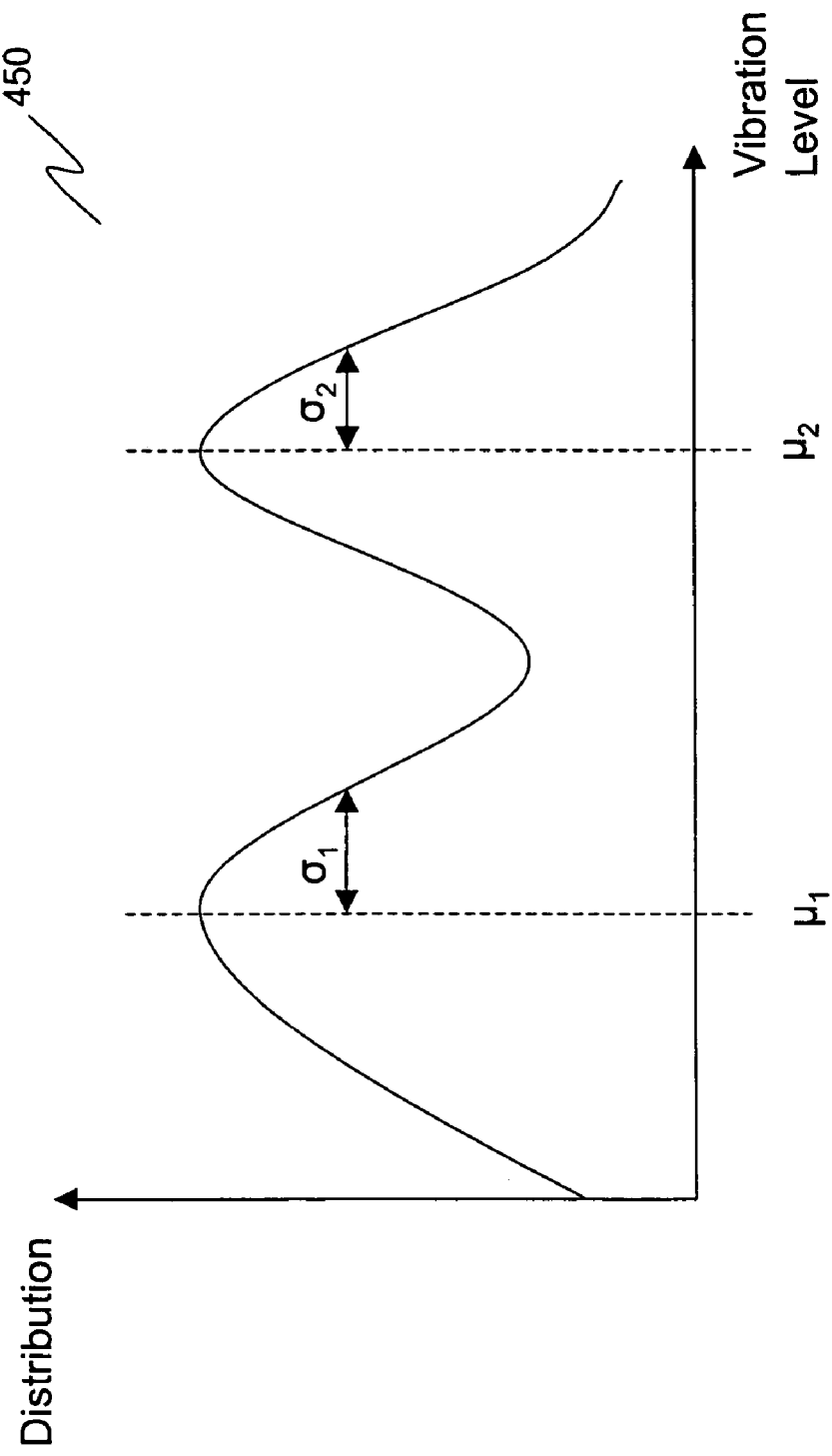
FIG. 6 is a graph showing an example of the nighttime distribution of the recorded vibration level from a single recorder.

Referring to FIG. 6, a graph 450 shows a possible distribution of the recorded vibration level, sampled at many times during a single night by a single recorder. Visualizing the distribution of the recorded vibration level allows interpretation of the nighttime vibration activity. For example, as shown in FIG. 6, background vibration activity may be represented by the apparent normal distribution with mean $\mu_1$ and standard deviation $\sigma_1$. When leakage is present, the mean vibration level $\mu_1$ may be high compared to situations where leakage is not present and the standard deviation of the background vibration activity $\sigma_1$ will tend to be small compared to $\mu_1$ and compared to situations where leakage is not present. Background vibration activity may include transient or sporadic events from causes such as irrigation systems (sprinklers), nighttime usage, pumps, and other vibration sources. The graph 450 shows a possible bi-modal distribution which includes the effects of this transient activity represented by the apparent normal distribution with mean $\mu_2$ and standard deviation $\sigma_2$. Other forms of the distribution of nighttime vibration activity may occur, including for example, a widened or skewed distribution, or activity that follows a non-normal parametric or a non-parametric distribution.

Figure 7:
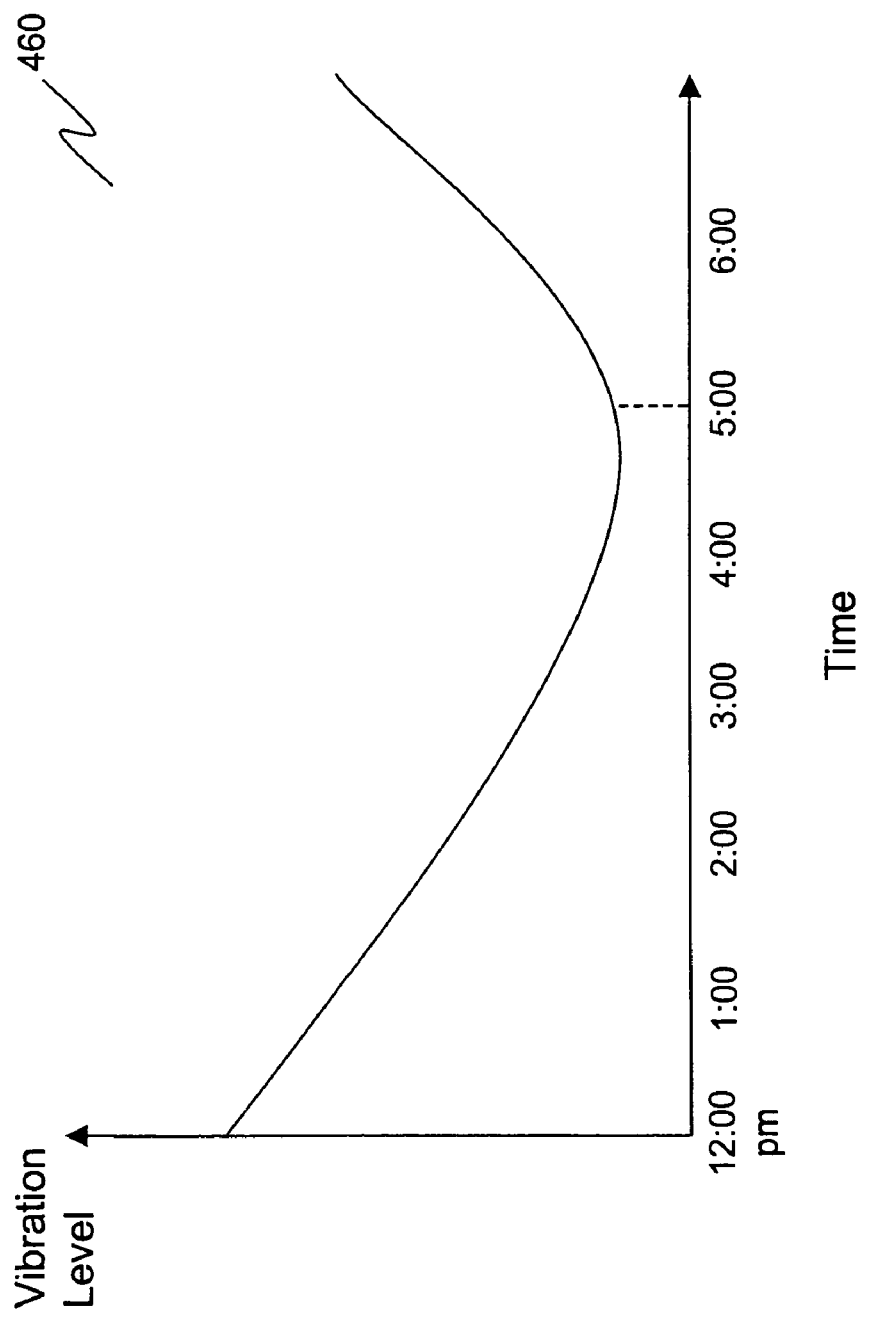
FIG. 7 is a graph showing an example of the nighttime recorded vibration level from a single recorder.

Referring to FIG. 7, the nighttime vibration activity also may be shown as a graph 460 that expresses the relationship between the vibration level and the time of day. A minimum vibration level is presumed to occur at some time during the night and corresponds to the quiescent pipe signal. Visualizing the nighttime activity as a time series allows interpretation of continuous and transient aspects of the nighttime vibration activity.

Other advantages of the visualization capabilities shown in FIGS. 6 and 7 are apparent. For example, unintended usage such as drawing water from fire systems may be detected from examination of the recorded vibrations. The theft or unauthorized usage of product from water, gas, petroleum, or other pipelines may also be detected from examination of the recorded vibrations. Other applications of the system are readily apparent. For example, the recorded vibrations can be used to document and visualize an approximate usage profile of product at a particular point from a pipeline over a particular time period. Comparison of recordings from two or more such time periods can be used to detect changes in the usage profile at a particular point from a pipeline.

The representation of nighttime vibrations may include, but is not limited to, the following parameters: absolute vibration level of the quiescent pipe signal, frequency content of the quiescent pipe signal, distribution of frequency content during the nighttime period, and a comparative measure of these parameters with what has been historically recorded. The goal of the signal processing is to reduce the available nighttime data (30 million bytes for two hours at 4,000 samples per second and one byte per sample) to a characterization or compression of the useful information contained within 64 to 4096 bytes.

Referring again to FIG. 1, in one implementation, each recorder 10 independently makes a series of vibration recordings every night. In general, a recorder may be able to sense vibrations from a distance of up to 500 feet or greater. The recordings are processed to produce a useful representation of the nighttime vibration levels. For example, the recorder 110 may be configured to monitor vibrations at night, process the monitored vibrations, and enter a low-power SLEEP state during the day and at all times when not recording or communicating.

In one implementation, vibration signals are digitized by the processor 210 at a sampling rate of 2,048 Hz. Recording begins at 12:15 am and occurs once per minute until 4:30 am for a total of K=256 recordings. Each recording lasts for one second and is denoted by $x_k(i)$, where k is the recording number and i is the sample number within the recording. Vibrations from pipes typically manifest as pseudo-random stochastic processes, sometimes with a specific spectral structure. Accordingly, each recording may be statistically processed to extract useful information with a reduced storage requirement. One useful method is to compute the mean absolute value of the recording, defined as:

$$E[|x_k(i)|] = \sum_{i=1}^{N} |x_k(i)|/N = \overline{|x_k|}$$

where E[ ] represents mathematical expected value and the recording is composed of N=2048 samples. If it is assumed that the pipe vibration signal follows a statistically normal distribution, then the values of $\overline{|x_k|}$ resulting from each of the K recordings will follow a statistical chi-square distribution. It is useful to define the following quantities:

$$\mu_q = \sum_{k=1}^{N} \overline{|x_k|}/K$$

and $$\sigma_q = \sqrt{\sum_{k=1}^{K} (\overline{|x_k|} - \mu_q)^2 / K}$$

where $\mu_q$ and $\sigma_q$ are, respectively, the mean and standard deviation of this assumed chi-square distribution considered for the ensemble of K recordings made on day q. In the presence only of flow noise, it has been determined that the relationship between $\mu_q$ and $\sigma_q$ is specific, namely that $\mu_q$ is approximately equal to $\sigma_q$. In the presence of vibrations due to leakage or transient phenomena, the distribution may no longer follow an approximate chi-square form. In this instance, it is useful to store enough information to approximate the form of the distribution of $\overline{|x_k|}$. One example of such an approximation is to compute the values of the bins of a histogram that approximately follows the distribution of $\overline{|x_k|}$. This procedure first defines the boundaries of 2p bins as $\mu_{q-1} \pm na\sigma_{q-1}$, where n ranges from 1 to p and a is a constant, e.g. 0.2. By counting the number of occurrences when $\overline{|x_k|}$ falls within each bin, either a parametric or a non-parametric distribution for $\overline{|x_k|}$ may be approximated. The values of $\mu_{q-1}$ and $\sigma_{q-1}$ are used as a starting point for the distribution computed on day q. This assumes that the mean and standard deviation of the distribution may not differ significantly from day q−1 to the following day, q.

Another useful reduction of the set of vibration recordings is the value of $\overline{|x_k|}$ corresponding to either the quietest or some other desirable characteristic of any recording made during the night. This parameter may correspond to the quiescent pipe signal and may be termed the quiescent parameter. The quiescent parameter will be useful assuming that the recording duration is sufficiently long that $x_k(i)$ can be considered an accurate reflection of the pipe vibration signal present at recording time k. Alternatively, a useful subensemble of the ensemble of K values of $\overline{|x_k|}$ may be used to compute the quiescent parameter. For example, it may be useful to compute the quiescent parameter by averaging a number of values of $\overline{|x_k|}$ corresponding to, for example, the quietest recordings made during the night.

Pipe vibration signals may contain different energies at different frequencies. It is useful to form a representation of the variation of vibration energy versus frequency, denoted by X(m), where m represents discrete frequency. Many methods exist for estimating X(m). These include application of the Fourier transform, application of other numerical transforms, processing the recorded data with difference equations to emphasize a particular frequency band, and other well-known numerical digital signal processing methods. Segmentation of the pipe vibration signal into one or more discrete frequency bands can allow a discrimination of signal components. For example, $x_k(i)$ can be segmented into $x_k^v(i)$, where v ranges from 1 to V and represents a number of discrete frequency bands. These bands may be determined using a so-called basis set, including for example an octave filter bank or a wavelet transform. All of the processing methods described above and performed with $x_k(i)$ may equally well be performed with $x_k^v(i)$ (i.e. discrete frequency bands of the pipe vibration signal may be processed individually or jointly).

Due to the stochastic nature of pipe vibration signals and the transient nature of other vibrations, the parameters described above may not always be reliable indicators of leakage and other vibration phenomena. An important aspect of the described techniques is the ability of the recorder to adapt to its environment. The recorder performs such an adaptation by taking into account the changes of vibration signals experienced over one or more nights. Any quantitative parameter, y, (including but not limited to the parameters described) may be tracked on a night-by-night basis as follows:

$$\overline{y}_q = \frac{1}{R} y_q + \frac{R-1}{R} \overline{y}_{q-1}$$

where $y_q$ is the parameter to track on day q, R is the number of days over which to track the parameter, and $\overline{y}_q$ is the weighted average of the parameter computed for day q. The variable R may be referred to as the tracking period, measured in days. If the parameter being tracked, y, is, for example, vibration level, and R is equal to 7, then $\overline{y}_q$ will be a weighted average of the vibration level over the last 7 days. The parameter $\overline{y}_q$ is thus useful because it effectively 'remembers' the vibration level for up to 7 days. If the vibration level suddenly changes on day q, then $\bar{y}_q$ can be usefully compared to $y_q$ to detect this sudden change.

The variable R may also usefully be set to, for example, 14, 30, or 90 days, or some other time period. Denoting the tracked parameter with the tracking period, R, as $\bar{y}_q^R$, a matrix of tracked parameters may be defined with several different parameters, each tracked over several different tracking periods. The different tracking periods allow comparison of the current value of any parameter, $y_q$, with its weighted average value, $\bar{y}_q^R$, computed over R days. The comparison will be most sensitive to changes that have evolved over approximately R days. For example, if a leak in a pipeline develops over the course of a month, there may not be a significant change in a parameter y measured from night to night, however the comparison of $\bar{y}_q^{30}$ with $y_q$ can be expected to be significant. Similarly $\bar{y}_q^{90}$ may be expected to track seasonal changes in parameter y.

This method of tracking a parameter offers several advantages. For example, updating and storing in the memory of the recorder a small matrix of parameters y, each recorded over a number of different tracking periods R, obviates the need to store the values of individual parameters for every day. This is advantageous in that less power is required to transmit a smaller amount of data from the recorder and less memory is required in both the recorder and the reader. The tracking period R in the recorder may be programmed using the reader.

It is not necessary to program the recorder with specific rules for determining whether a particular characteristic of a parameter may be indicative of normal phenomena, including, for example normal flow, environmental noise, pump noise and other normal phenomena, or whether the parameter may be indicative of abnormal phenomena such as, for example, leakage or unauthorized usage. The characteristics of parameters generally vary unpredictably from pipe to pipe, from location to location, and according to the season of the year, pressure, characteristics of the pipe, and other factors. For example, a moderate or loud vibration on a pipe may be due to higher flow, a larger pipe, construction occurring in the vicinity, a fire hydrant or pipeline flushing program, leakage, or some other cause. The method of tracking enables the recorder to adapt to its environment. The recorder is able to provide both the parameters of the recorded vibrations and the tracking information, allowing subsequent analysis to interpret both, either individually or together. The method of tracking is therefore able to take into account unexpected or unpredictable phenomena occurring either permanently or temporarily over any arbitrary time period.

Water distribution systems often experience varying seasonal flows due to irrigation and other seasonal demands. Similarly, gas distribution systems often experience varying seasonal flows due to heating and other seasonal demands. Another useful advantage of the method of tracking is to be able to perform seasonal adjustments to the recorders' data, thereby taking into account either predictable or unpredictable variations occurring over any arbitrary time period.

Referring again to FIG. 1, a reader 115 is brought into proximity with a recorder 110 from time to time. For example, the reader 115 might be carried by a meter reader, mounted to a utility vehicle, or kept by a homeowner. The reader 115 may be a device that, for example, weighs approximately three ounces and is the size of a pager, or a device attached to or incorporated in a meter reading device.

Figure 8:
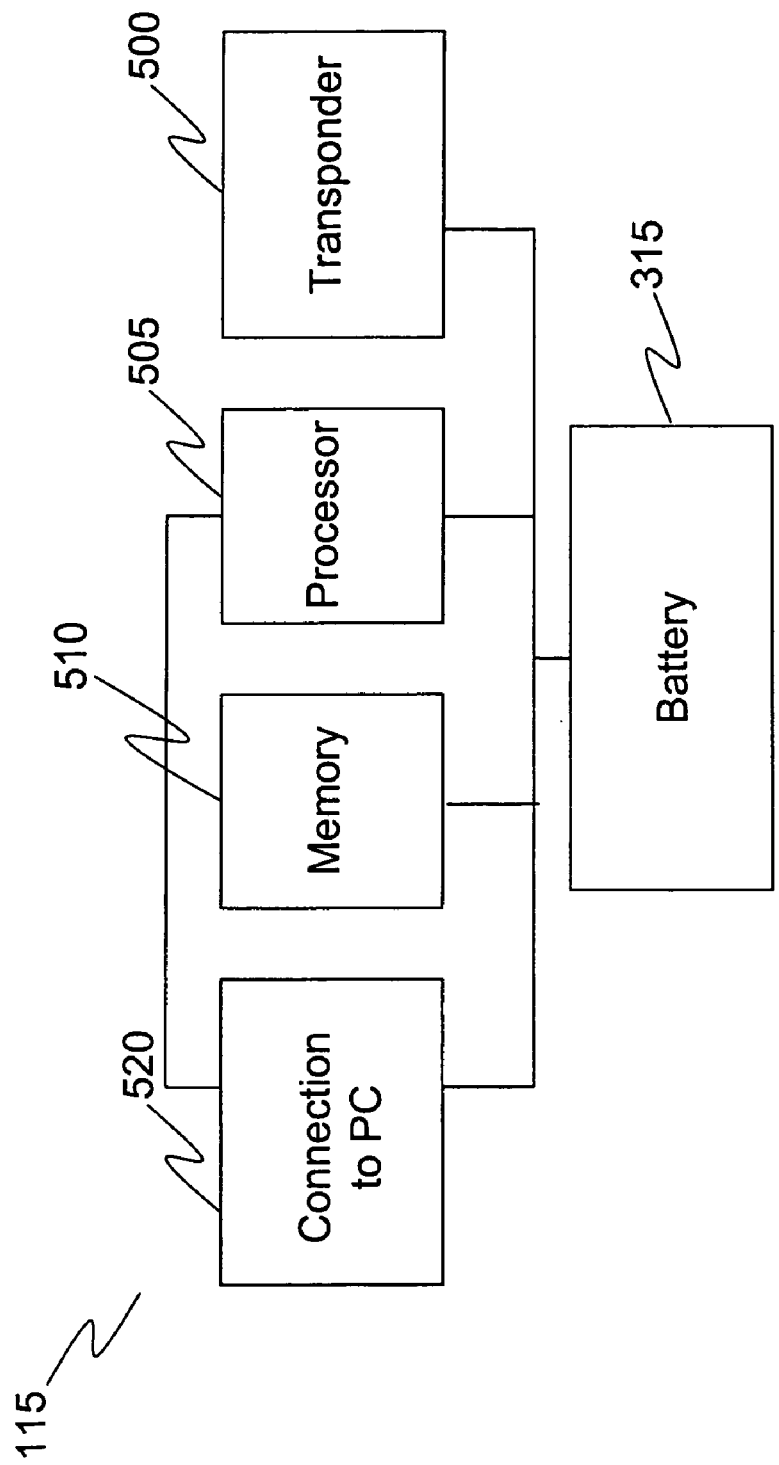
FIG. 8 is a block diagram of a reader of the system of FIG. 1.

Referring to FIG. 8, the reader includes a transponder 500, a processor 505, a memory 510, a battery 515, and a computer connection 520. The transponder 500 periodically transmits (e.g. once every 10 seconds) a radio message that may be referred to as a broadcast 'PING'. For example, in an implementation involving a water system, a meter reader carries a reader 115. This device transmits a frequent PING by radio to wake up any recorders 110 within radio range. In one implementation, the radio range is 75 feet.

If the recorder receives this PING while in the low-power SLEEP state, the recorder wakes up and transmits an acknowledgement that includes the recorder's processed results. The reader 115 receives the acknowledgement and, under control of the processor 505, stores the processed results in memory 510. In one implementation, a reader has storage capacity for results from on the order of 16,000 different recorders. This data transport from the recorder to the reader is completely automatic and requires no special action on the part of the meter reader as he or she performs his or her normal tasks. Both the recorder and the reader manage power optimally so as to conserve the life of the battery 315 (FIG. 3).

The reader 115 also may be operable to upgrade or modify the software of a recorder through transmission of a message to the recorder. This message may be transmitted in response to an acknowledgement received from the recorder.

The reader 115 may be connected to the computer 120 through the computer connection 520, which may be a wired or wireless connection 520. Upon connection, processed recorder results stored in the reader's memory 510 are transmitted to the computer 120 for further processing. In one implementation, the transponder 500 also operates as the computer connection 520.

For example, the meter reader may deposit the reader in the office at the end of the working day. The processed data from all recorders visited by one or more meter readers is now available in one or more readers. The one or more readers may be connected directly to a computer at this point to transfer this data to a computerized database.

Figure 9:
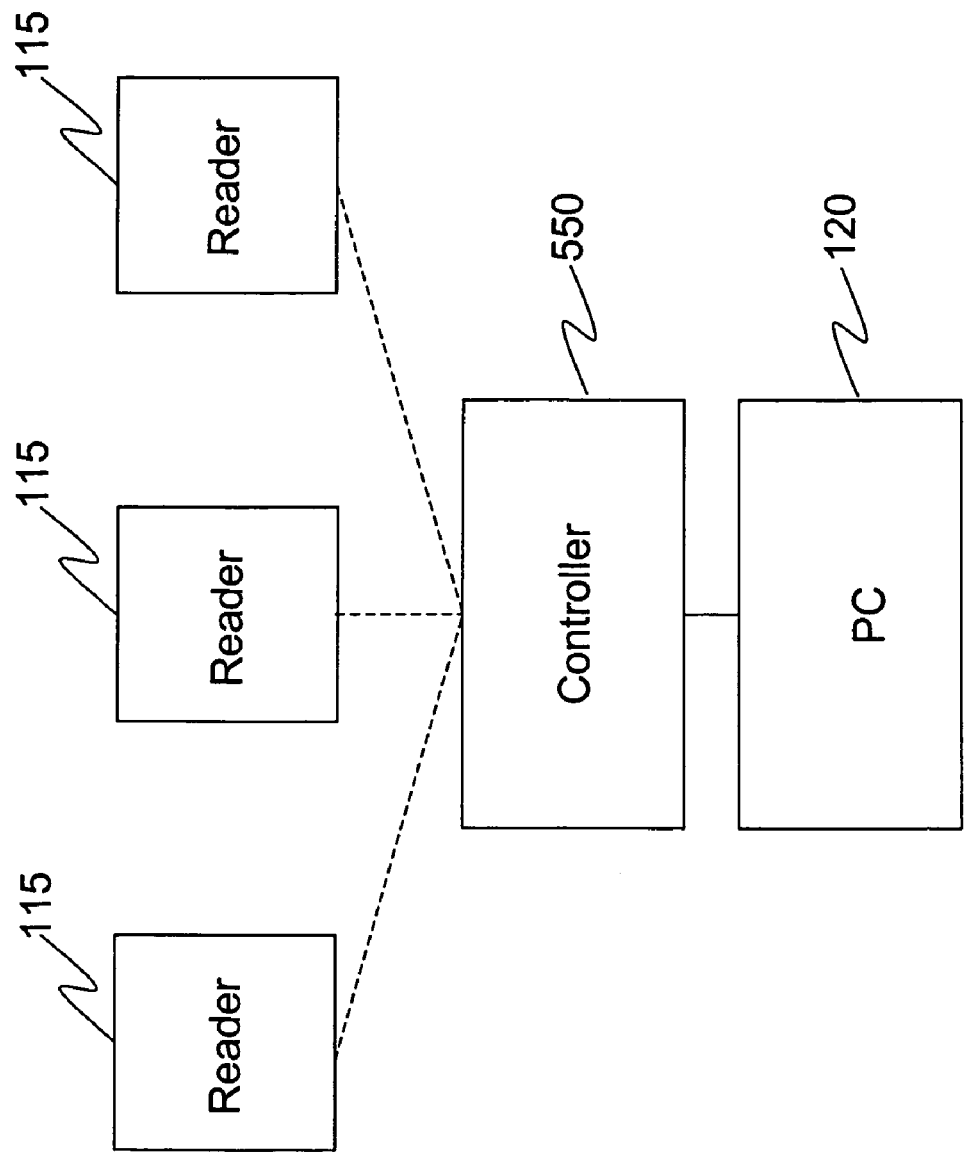
FIG. 9 is a block diagram of a controller of the system of FIG. 1.

Referring to FIG. 9, the computer 120 may optionally include a controller 550 that is operable to communicate with multiple readers 115 to collect processed recorder results and deliver the processed recorder results without human action. For a water company, for example, this accomplishes collecting vibration data from many service point locations and bringing the data to a central computer with no human action other than that normally engaged in for the purposes of reading the water meters.

The controller 550 may be a special form of reader 115 that is electronically connected to a computer 120. During the night, the computer causes the controller to establish radio communication with all readers present. The controller collects the data by radio from the readers and transfers this data to a computerized database.

The computer 120 includes software that may be used to create an information profile for each recorder. This profile may include information useful for maintaining the system, such as the deployment date, the last reading date, and the map/GPS location of the recorder, as well as information for interpreting the processed results, such as the type and size of pipe on which the recorder is installed, the water main connected to that pipe, the type of location (e.g. residential, industrial, urban or rural), and a leakage history for that area.

The software automatically computes a leak index (e.g. a value between 0 and 100) for each recorder, using a combination of processed results and information profiles from one or more recorders. A leak status can be assigned by quantizing the leak index, with each leak status being assigned a different color for display purposes. For example, a leak index of 0-60 may be designated as representing no leak and assigned the color green, a leak index of 60–80 may be designated as representing a possible leak and assigned the color yellow, and a leak index of 80–100 may be designated as representing a probable leak and assigned the color red.

The leak index may be based on individual recorder processed results, such as absolute levels of vibration, consistent patterns of vibration over time, gradually increasing levels of vibration over time, a sudden increase in vibration levels, or changes in spectral composition of the recorded vibrations. These contributors are based on a priori information (i.e. generally available knowledge about the relationship between leaks and pipe vibrations).

The leak index also may be based on the processed results of a set or subset of recorders, such as the loudest recorders; the recorders with the widest frequency content; the recorders with the greatest changes in level or frequency content over a time period of, for example, 7, 30 or 90 days; or the recorders within a subset, such as a type of location or a type of connected pipe, with processed results that are unusual (i.e. outliers in the statistical distribution of the subset). The leak index may be further impacted by network factors, such as leak size, sensitive location (e.g. museum basement), and known profile information, such as leakage history, the presumed likelihood of a leak at the recorder's location, and pipe size, age, and pressure.

Quantizing the leak index (0–100) to a leak status (green, yellow, red) aids leakage management. The quantization may be based on, for example, operations and maintenance resources. For example, in a 1,000-mile network, how many leak pinpointing investigations can be budgeted in a meter-reading cycle? The system can be set to generate a fixed number of probable leaks based on available resources (i.e. the system can be configured to detect the largest number of most likely leaks that can be investigated with available resources).

The quantization also may be based on leakage minimization so as to provide the most leakage recovered per operating dollar spent. This approach implies using all data to optimize the rate of true positive leak identifications.

The quantization also may consider network optimization/leakage management. In particular, the leak status may be set using the current estimate of leakage density within the network as a whole. For example, consider a network with 1,000 miles of water mains, 100,000 metered accounts, and one recorder installed on average for every 10 meters, i.e. 10 recorders per mile. Assuming that the network has 500 leaks, the network-wide probability of a recorder hearing a leak is approximately five percent. On this basis, with a total of 10,000 recorders the percentage of recorders assigned a leak status of red would be five percent of all recorders.

Figure 10:
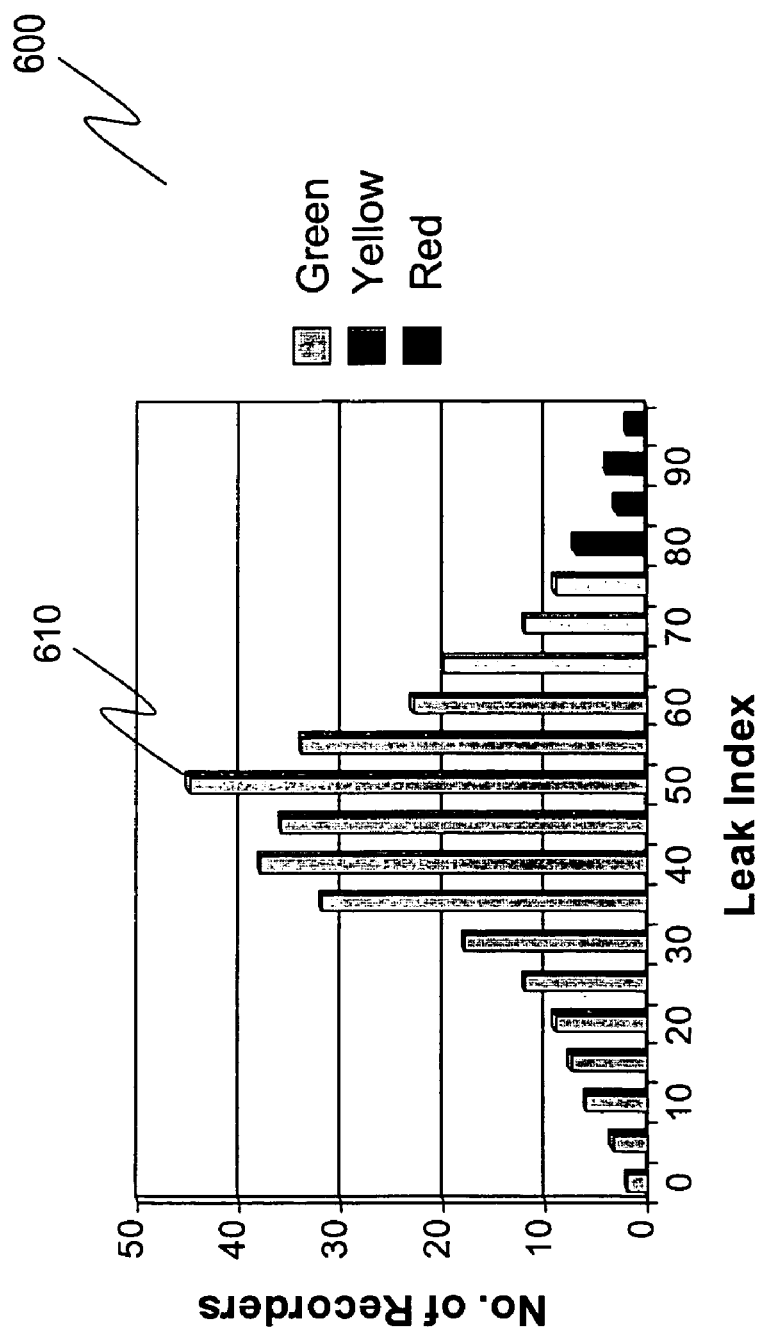
FIG. 10 is a graph showing a distribution of a leak index among all the recorders in a system.

Referring to FIG. 10, a graph 600 illustrates the distribution of a leak index (or any other quantitative parameter, such as vibration level) from all recorders or a subset of recorders. The graph 600 shows, as an example, a statistically normal distribution of the leak index among all the recorders in the system. The graph also shows approximately how many recorders are assigned a green, yellow, or red leak status according to the particular quantization used to create the graph. Specifically, referring again to FIG. 10, the horizontal axis of the graph represents leak index values running from left to right. Each bar 610 represents the number of recorders (the units of the vertical axis) occupying a particular range of leak index values. The color of the bar (green, yellow, or red) represents the leak status of all recorders occupying the particular range of leak index values corresponding to that bar. If the quantization relationship between the leak index (or another quantitative parameter used to create the graph) and the leak status is changed, the approximate number of recorders assigned a particular leak status can be easily visualized.

Figure 11:
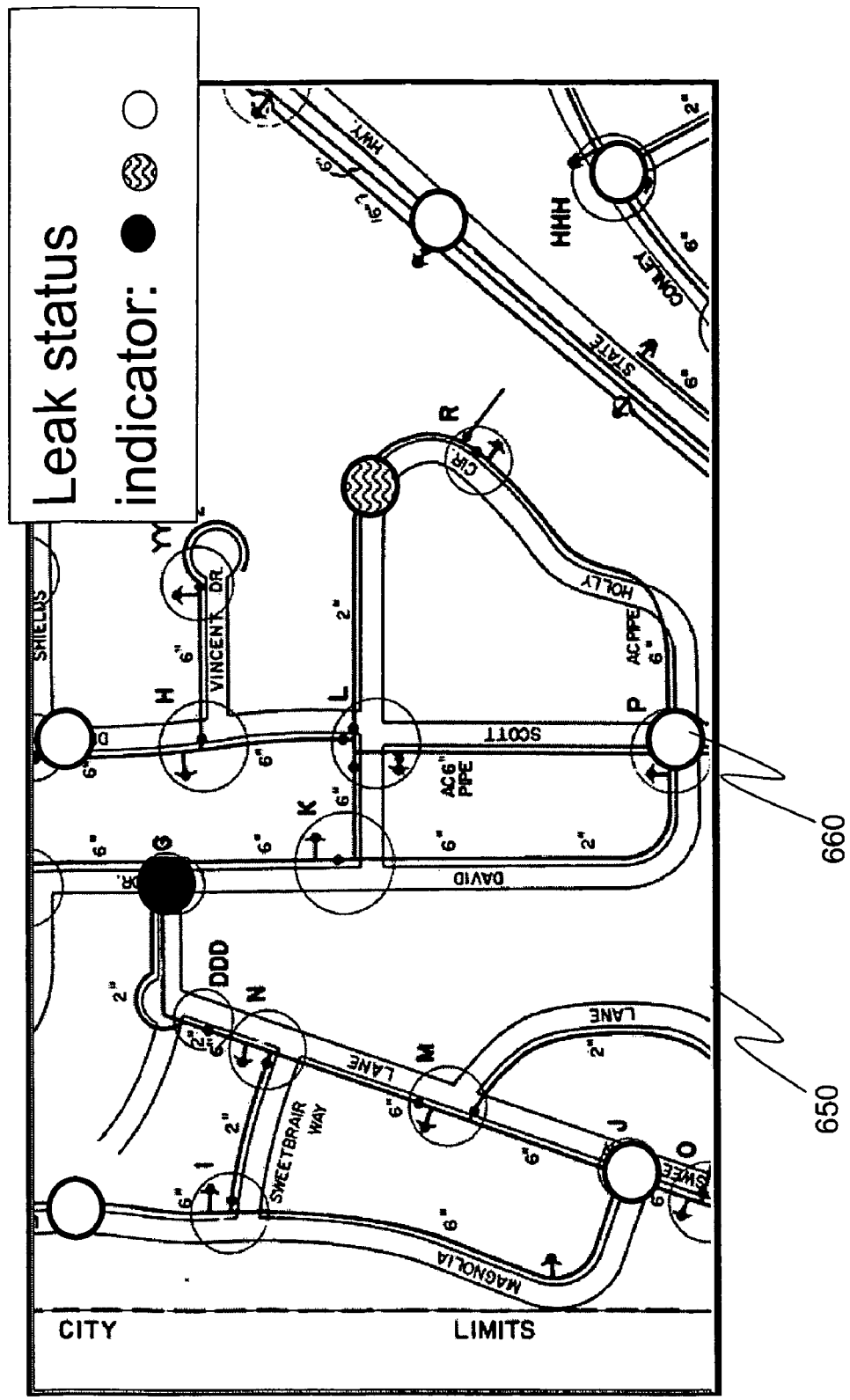
FIG. 11 is a map with symbols used to represent the positions of recorders on the map.

It is often advantageous to present information about the leak status of many recorders in the context of maps showing the areas in which the recorders are installed. Referring to FIG. 11, a map 650 includes symbols 660 that represent the positions of recorders on the map. The symbols may be color-coded to display the leak status of the recorder corresponding to the symbol. The leak status may be programmed to reflect a quantization of the leak index or any other quantitative parameter obtained from the recorders.

Figure 12:
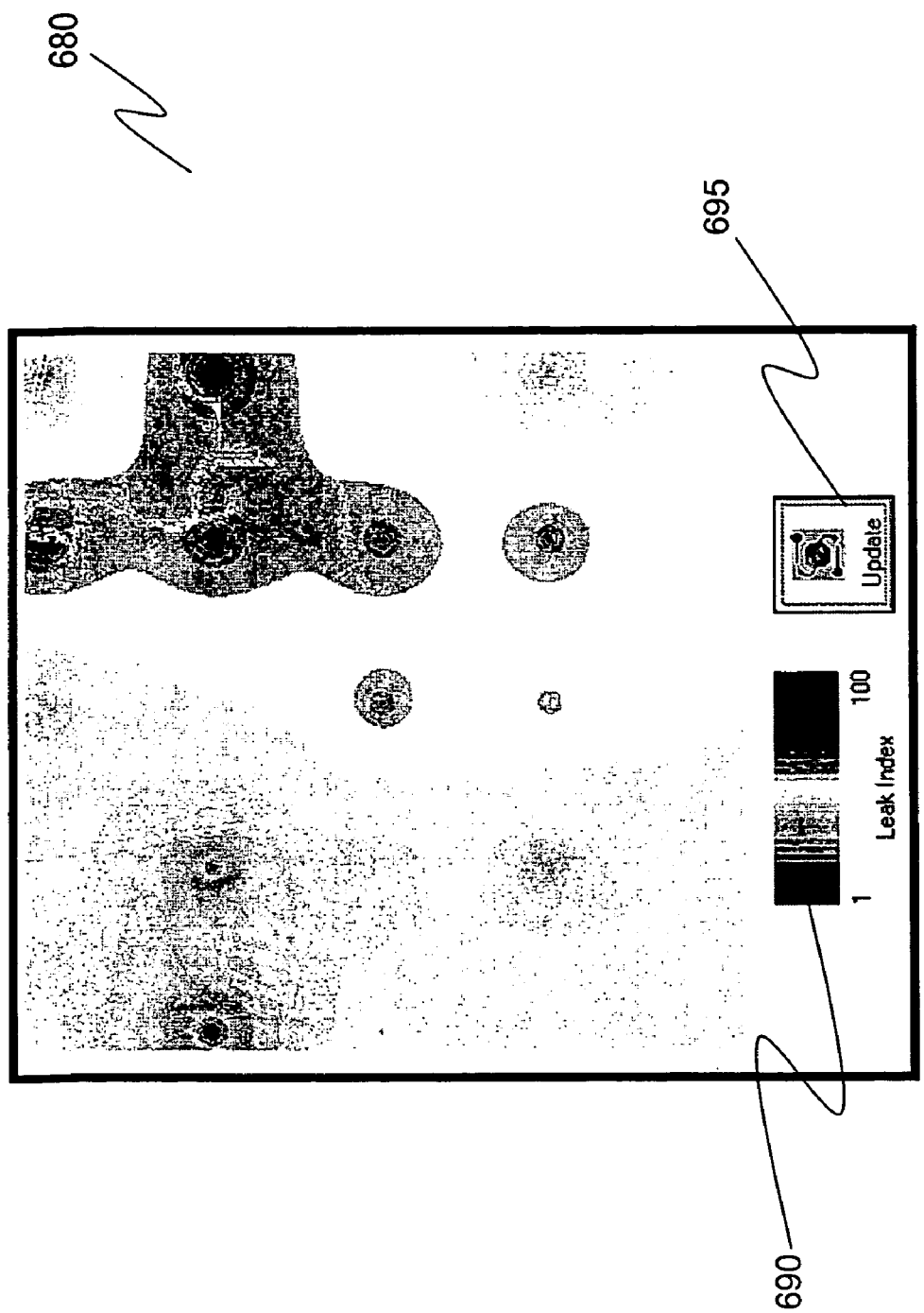
FIG. 12 is a solid color map showing a value of a leak index at all locations on the map.

Another useful method of visualizing information from many recorders in the context of maps showing the areas in which the recorders are installed is a solid color map. Referring to FIG. 12, a solid color map 680 shows a value of a leak index (or another quantitative parameter) at all locations on the map. The color at each location on the map is mapped to a particular value of the leak index using a color scale 690. With a solid color mapping of the leak index, the locations of all recorders present on the map may be given the known leak index of that recorder. All other locations on the map may be given a computed value of the leak index that is extrapolated from the known values of the leak index of nearby recorders. This extrapolation may be performed using a number of well-known algorithms.

The solid color map 680 may be updated at any time under software control using, for example, an update button 695. The update feature is useful for varying the map scale, and the number of recorders and geographical area included in the solid color map. The solid color map 680 allows visualizing the extent of vibrations recorded by one or more recorders. The solid color map 680 may be useful in computing and visualizing an approximate location of possible leaks using the vibration recordings of one or more recorders. The solid color map 680 may be overlaid and merged with details of aerial photographs, city maps, or maps of the pipeline system.

Figure 13:
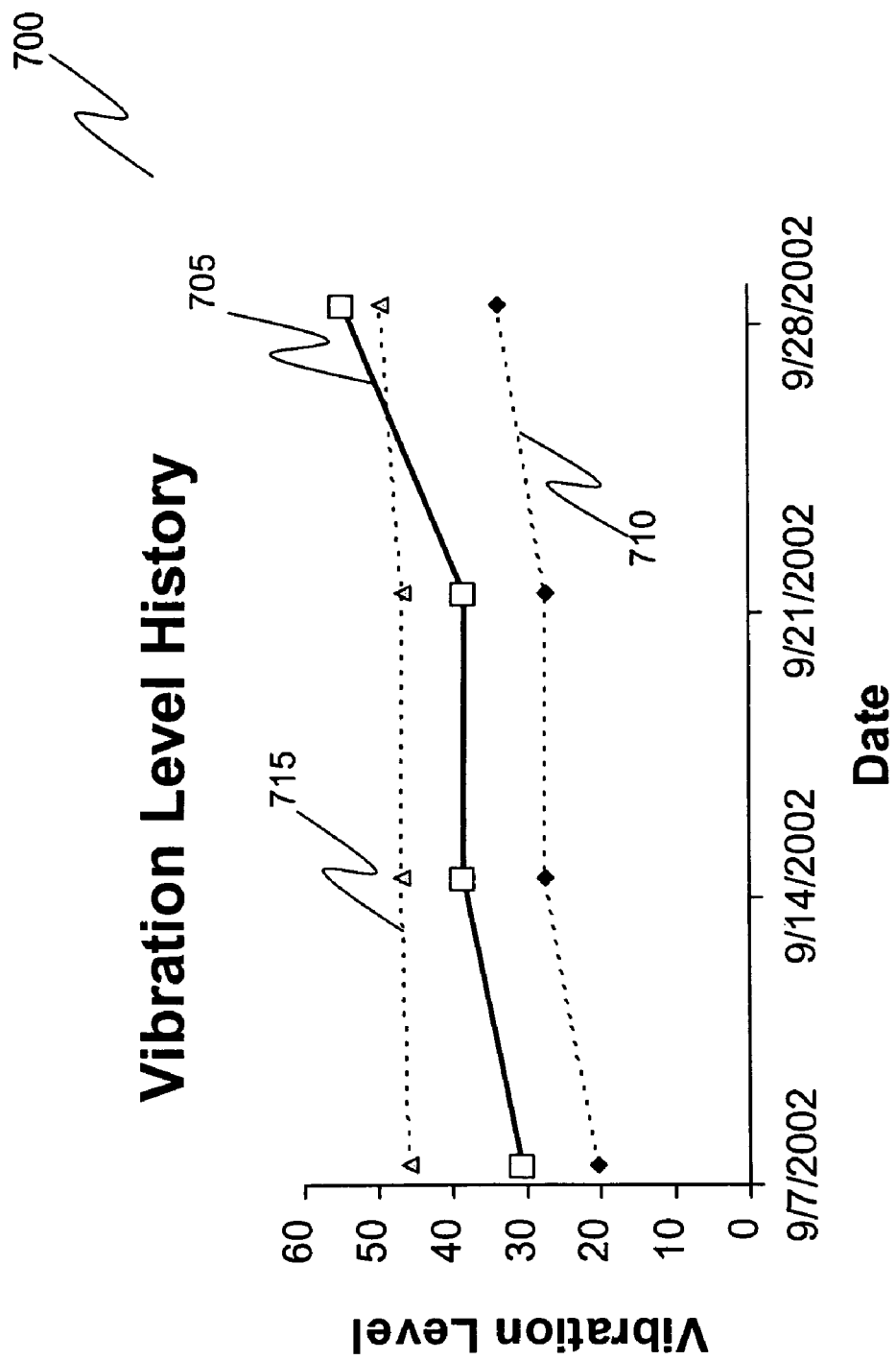
FIG. 13 is a graph showing the vibration level history of a single recorder of the system of FIG. 1.

Each recorder may also have a stored history of processed data. Referring to FIG. 13, a graph of vibration level history 700 may display a mean vibration level 705 together with a lower range measure 710 and an upper range measure 715. The lower and upper ranges may be computed from the history of processed data and represent estimates of the variation of the vibration level relative to the mean vibration level. The lower and upper range elements may also be omitted. Any historical quantitative parameter may be similarly displayed. The graph of vibration level history 700 is useful for visualizing changes that may have occurred over any available period of time in the vibration recordings of one or more recorders.

Figure 14:
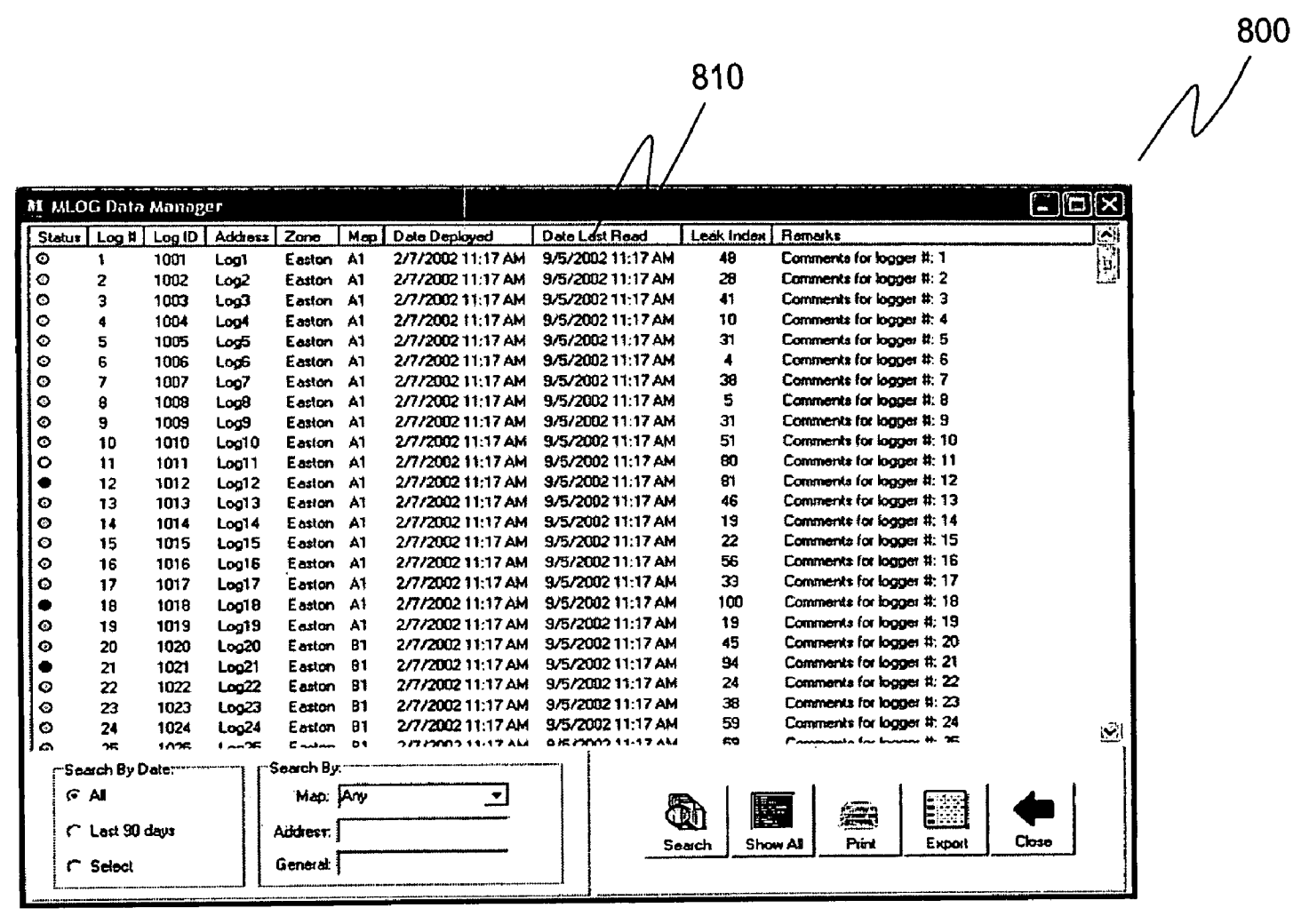

It may also be useful to select recorders' according to some criteria based on the recorders' information profiles and processed vibration data. Referring to FIG. 14, a database table 800 may show parameters of the recorders, including for example, leak index, leak status, map, address, and remarks entered by the system user. These parameters may be arranged in a database table that can be printed or exported to other software. Any subset of recorders can be defined, based on selecting particular values, or ranges of values of the parameters that are organized as the columns 810 of the database table 800. The columns may be sorted in some useful order. Other database capabilities may be incorporated to aid in managing the installation or information profiles of the recorders, the analysis of the recorders' processed vibration data, or the investigation of leaks or other activity that will occur as a result of the analysis.

Reports may be generated electronically or may be printed in order to aid these management, analysis, and investigation activities. The components of a report may contain a map, a database table with selected parameters from a set or subset of recorders, and other elements such as a title, date, or signature line that may aid the management, analysis, and investigation activities.

Figure 15:
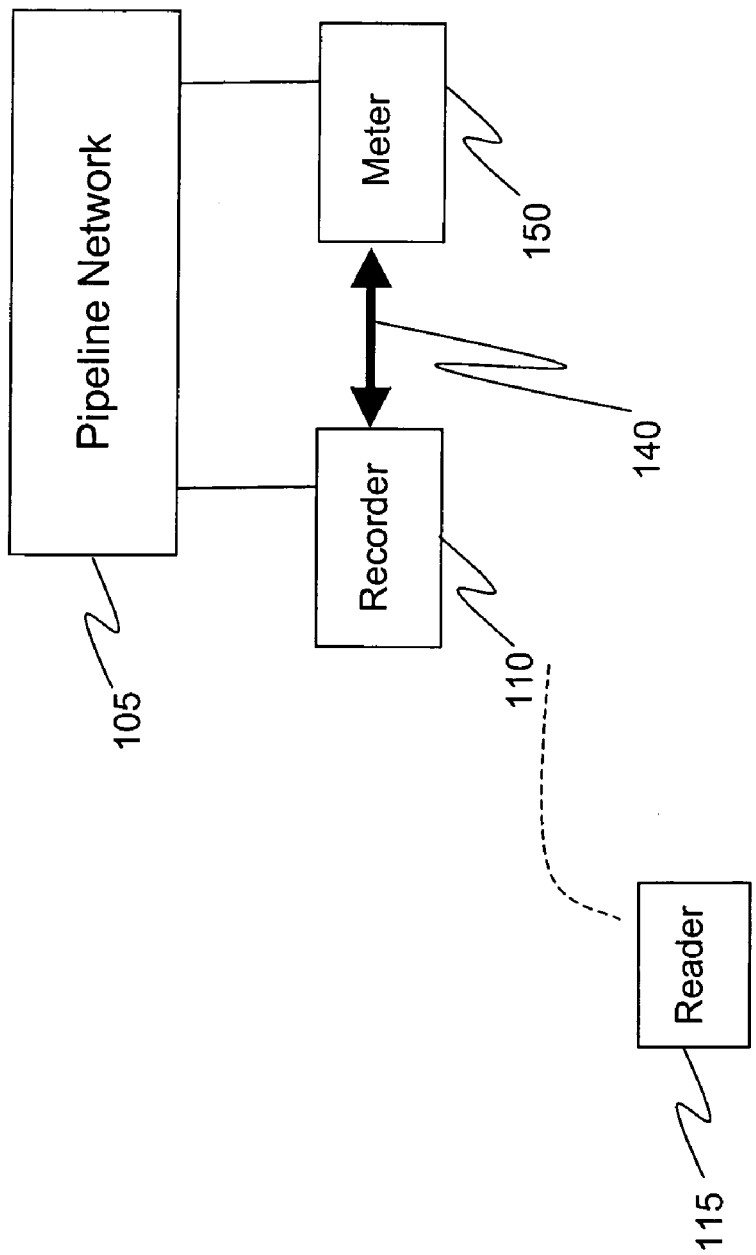
FIG. 15 is a block diagram of a system for tracking vibrations and meter readings in a pipeline network.

In another implementation, as illustrated in FIG. 15, a recorder 110 is connected permanently to a meter 150 through the meter's built-in electronic interface (MEI) 140. In a typical 3-wire interface, the processor 310 of the recorder 110 provides power and a sequence of clock pulses on one wire to activate the MEI. The MEI responds by sending the current meter reading to the recorder using an industry-standard sequence of characters on a second wire. For example, the MEI may reply to the clock pulses by sending the sequence "RB 1234,0,4". The sequence is encoded as a digital sequence of ones and zeros where a low voltage represents a zero and a high voltage represents a one. The recorder decodes this industry standard sequence as the current meter reading (indicated by "RB") being 1,234 U.S. gallons (indicated by "0,4"). The third wire is an electrical common wire. Other implementations may provide a connection between the processor and the meter using electronic interfaces such as those using one or two wires, or using wireless interfaces. In yet other implementations, the recorder and the meter may be a single, integrated unit.

The recorder converts the output of the MEI 140 to a binary number and saves this number in the memory of the processor 310. The recorder may be programmed to read the meter using the MEI at specific times or specific time intervals.

By reading the meter value through the MEI at regular intervals (e.g., every 4 hours), the recorder can create a history of usage or consumption of the metered product, which might for example be water, gas, petroleum, or another pipeline fluid. The history of usage—or the usage profile—can be stored in the memory of the processor. The processor may be programmed to encode the values of the profile in order to conserve memory space and to store the profile more efficiently for subsequent transmission by the radio transceiver 320. One useful encoding scheme includes computing the difference between successive meter readings, denoted by x. If x ranges from 0 to 64,000, taking 16 bits of digital memory, then the value of x can be encoded by the transformation, $N = \log_2(x)$. The parameter N is a representation of x that requires only 4 bits of digital memory with the loss of some resolution of x. The sequence of values of N represents the usage profile, or pattern of usage of product passing through the meter. This sequence may be stored for a programmable time (e.g., 30 days). Subsequent values of N replace the oldest values to allow the most recent 30 days of data to be stored. The usage profile may be used to detect, for example, leaking appliances in a residential application.

By reading the meter value through the MEI at frequent intervals (e.g., every minute), the recorder can store data that is useful for assessing the pattern of activity at the meter. In one implementation, the difference in successive meter readings, x, can be used to create a meter pattern, y, as follows. If x is equal to zero there is either no flow through the meter or the flow was below the measurement resolution of the meter. This condition is denoted by y=0. If x is greater than zero, the meter has registered flow. This condition is denoted by y=1. In a 24-hour period there are 1,440 minutes. The meter pattern, y, is therefore represented by a series of 1,440 bits, with each bit having the value of zero or one, with the first value being measured at midnight. The meter pattern can be used to assess whether flow is approximately continuous or intermittent, at what time of the day or night flow is occurring, and whether any flow at all is occurring in the 24-hour period. The meter pattern, y, for any 24-hour period may be discarded as data from a new 24-hour period becomes available or it may be saved in the memory of the processor.

The meter pattern can also be used to assess the integrity of the meter or the security of the pipeline network. If the difference in successive meter readings, x, is negative, then the meter is registering flow in the reverse direction, i.e. flow into the pipeline network from the consumer's side of the meter. If this condition is encountered, then the starting time, duration, and quantity of reverse flow can be noted and saved in the memory of the processor. Unusual or unexpected patterns of meter activity can be detected by examination of the meter pattern under program control of the processor. For example, unexpected time periods of zero flow may indicate tampering or unauthorized bypassing of the meter. Unexpected periods of low or high flow may indicate a failure in the integrity or accuracy of the meter. Protracted or unexpected nighttime meter patterns may indicate a leak downstream of the meter or unintended usage by the consumer. The processor may be configured to generate and transmit an alert indication in response to any or all of these or similar conditions. The alert may be transmitted to any reader 115 that is within range. The reader 115 may be a handheld or vehicle-mounted device, or, in some cases, a unit permanently installed, for example, on a building roof or a utility pole.

The usage profile and the meter pattern stored by the processor may be transmitted to a reader 115 in the manner described previously. For example, the reader may transmit a PING to any recorder present in a specific form to request that the recorder transmit its processed results from vibration recordings, the computed usage profile, the computed meter pattern, an immediate meter reading, or any combination of these data.

Subsequent analysis of the usage profile transferred from the reader 115 to the computer 120 may be used to investigate the significance of the processed results of vibration recordings. For example, abnormal vibration energy and an unexpectedly high nighttime flow through the meter could indicate a leak that is downstream of the meter. Conversely, abnormal vibration energy and zero or normal nighttime flow could indicate a leak that is upstream of the meter. In another instance, normal vibration energy and continuous flow through the meter could indicate intended usage since the absence of abnormal vibration energy at the quietest time of the night indicates that flow was not present for an arbitrary period, which rules out a leak. Therefore, joint analysis of the processed results of vibration recordings and the usage profile provides additional benefits over these measurements considered separately. Analysis of vibration recordings and usage profiles from multiple recorders may be provide further insights and benefits.

Subsequent analysis of the meter patterns transferred to the computer 120 may be used to inform the consumer of unusual or problematic meter patterns. Analysis of the meter patterns may also be used to detect theft or unauthorized usage, such as excessive irrigation usage from a pipeline system conveying fresh water.

The architecture of the system 100 described provides additional benefits. The recorder may be connected to other types of devices than meters, such as pressure measuring devices, water quality monitors, valves, and other appurtenances and instrumentation connected to a pipeline system. In addition, the reader 115 may be programmed by the computer 120 to use its radio transponder 500 to transmit a new software program to the processor 310 without requiring a user to have physical access to the recorder. Such reprogramming of the processor will be useful if the meter type connected to the recorder is changed, if the recorder is to be connected to a different device, or if it is desirable to change or add an additional feature to the program of the processor. This capability may provide substantial savings to the user as new needs become apparent during the long life of the recorders.

A number of implementations have been described. Nevertheless, it will be understood that various modifications may be made. Accordingly, other implementations are within the scope of the following claims.

What is claimed is:

1. A method for tracking vibrations on a pipeline network, the method comprising:
   installing multiple vibration recorders on the pipeline network, each recorder comprising a sensor, a processor, and a communication device;
   at each vibration recorder:
      receiving vibration signals from the sensor at programmed times under the control of the processor of the vibration recorder, and
      processing the received vibration signals with the processor of the vibration recorder;
   communicating processed vibration signals from the vibration recorders to one or more reader devices using the communication devices of the vibration recorders;
   at a particular vibration recorder, receiving meter readings from a flow meter associated with the particular vibration recorder, the meter readings being indicative of a level of flow in the pipeline network;
   communicating the meter readings from the particular vibration recorder to a reader device using the communication device of the particular vibration recorder; collecting the processed vibration signals from the one or more reader devices and the meter readings from the particular vibration recorder at a central computer system; and
   analyzing the collected processed vibration signals and the meter readings at the central computer system to determine abnormal vibration patterns and to obtain measures of any leaks present in the pipeline network.

2. The method of claim 1 wherein the particular vibration recorder comprises a component of the flow meter.

3. The method of claim 1 wherein a vibration recorder further comprises a housing and a sensor of the vibration recorder comprises a piezo-film sensing element oriented in the housing so as to be at a known orientation to a flow in a pipe when the vibration recorder is installed on the pipe.

4. The method of claim 1 wherein communicating the meter readings from the particular vibration recorder to the reader device comprises doing so in response to a command sent from the reader device.

5. The method of claim 1 wherein communicating the meter readings from the particular vibration recorder to the reader device comprises doing so in response to a command from a device to which the particular vibration recorder is connected.

6. The method of claim 1 wherein communicating the meter readings from the particular vibration recorder to the reader device comprises doing so using a wireless communications channel.

7. The method of claim 1 wherein communicating the meter readings from the particular vibration recorder to the reader device comprises doing so in conjunction with communicating the processed vibration signals from the particular vibration recorder to the reader device.

8. The method of claim 7 wherein:
   the pipeline network comprises a water pipeline network,
   the flow meter comprises a water meter, and
   a meter reader carries the reader device such that communicating the meter readings and the processed vibration signals from the particular vibration recorder to the reader device comprises doing so in conjunction with a normal process of having the meter reader read the water meter.

9. The method of claim 1 wherein collecting the processed vibration signals and the meter readings from the reader device at the central computer system comprises connecting the reader device to the central computer system and downloading the processed vibration signals and the meter readings from the reader device to the central computer system.

10. The method of claim 1 wherein collecting the processed vibration signals and the meter readings from the reader device at the central computer system comprises communicating between the reader device and the central computer system using a wireless communication channel.

11. A method for detecting leaks in a pipeline network, the method comprising:
   installing a vibration recorder on the pipeline network, the recorder comprising a sensor, a processor, and a connection to a flow meter that produces meter readings indicative of a level of flow in the pipeline network;
   receiving vibration signals from the sensor at programmed times under the control of the processor;
   processing the received vibration signals with the processor;
   receiving meter readings from the flow meter through the connection at programmed times under the control of the processor; and
   detecting a leak in the pipeline network using the processed vibration signals;
   wherein detecting a leak in the pipeline network comprises using the meter readings in conjunction with the processed vibration signals, and comprises determining whether the leak is upstream or downstream of the flow meter based on a relationship between the meter readings and the processed vibration signals.

12. The method of claim 11 further comprising communicating the meter readings to a collection location using a communications device of the vibration recorder.

13. The method of claim 12 further comprising communicating the processed vibration signals to the collection location using the communications device of the vibration recorder.

14. The method of claim 11 further comprising generating a usage profile from the meter readings.

15. The method of claim 14 further comprising communicating the usage profile to a collection location using a communications device of the vibration recorder.

16. The method of claim 14 wherein detecting a leak in the pipeline network comprises using the usage profile in conjunction with the processed vibration signals.

17. The method of claim 14 wherein generating the usage profile from the meter readings comprises doing so using meter readings spaced by intervals of 30 minutes or more.

18. The method of claim 11 further comprising generating a meter pattern from the meter readings.

19. The method of claim 18 further comprising communicating the meter pattern to a collection location using a communications device of the vibration recorder.

20. The method of claim 18 wherein detecting a leak in the pipeline network comprises using the meter pattern in conjunction with the processed vibration signals.

21. The method of claim 18 wherein generating the meter pattern from the meter readings comprises doing so using meter readings spaced by intervals of less than 30 minutes.

22. The method of claim 11 wherein the pipeline network comprises a water pipeline network and the flow meter comprises a water meter.

23. A vibration recorder for detecting leaks in a pipeline network, the vibration recorder comprising:
structure for installing the vibration recorder on the pipeline network;
a sensor operable to receive vibration signals from the pipeline network;
a connection to a flow meter that produces meter readings indicative of a level of flow in the pipeline network;
a processor programmed to receive meter readings from the connection to the flow meter; and
a communication port operable to communicate data;
wherein the processor is programmed to communicate information regarding the meter readings as data using the communication port; and
the information regarding the meter readings comprises an alert indicating that the meter readings represent an irregular condition constituting at least one of reverse flow through the meter, continuous flow through the meter for more than a threshold period of time, and continuous flow through the meter at a level in excess of a threshold level.

24. The vibration recorder of claim 23 further comprising a communication port operable to communicate data, wherein the processor is programmed to communicate an alert regarding the sensed vibration signals as data using the communication port.

25. A vibration recorder for detecting leaks in a pipeline network, the vibration recorder comprising:
structure for installing the vibration recorder on the pipeline network;
a sensor operable to receive vibration signals from the pipeline network;
a connection to a flow meter that produces meter readings indicative of a level of flow in the pipeline network;
a processor programmed to receive meter readings from the connection to the flow meter; and
a communication port operable to communicate data, wherein the processor is programmed to communicate information regarding the meter readings as data using the communication port, and wherein the information regarding the meter readings comprises a usage profile generated from the meter readings.

26. The vibration recorder of claim 25 wherein the information regarding the meter readings comprises measurements of flow.

27. The vibration recorder of claim 25 wherein the information regarding the meter readings comprises a meter pattern generated from the meter readings.

28. The vibration recorder of claim 25 wherein the information regarding the meter readings comprises an alert indicating that the meter readings represent an irregular condition.

29. The vibration recorder of claim 25 wherein the irregular condition constitutes reverse flow through the meter.

30. The vibration recorder of claim 25 wherein the irregular condition constitutes continuous flow through the meter for more than a threshold period of time.

31. The vibration recorder of claim 25 wherein the irregular condition constitutes continuous flow through the meter at a level in excess of a threshold level.

* * * * *